United States Patent [19]

Pusch et al.

[11] 4,433,025

[45] Feb. 21, 1984

[54] HEAT REFLECTING WALL OR CEILING COVERING

[76] Inventors: Günter Pusch, Bannholzweg 12, 6903 Neckargemund 2; Dieter E. Aisslinger, Heidestr. 54, 6222 Geisenheim; Alexander Hoffmann, Schlostrasse 32, 6909 Rotenberg; Klaus-Werner Pusch, Bannholzweg 10, 6903 Neckargemund 2, all of Fed. Rep. of Germany

[21] Appl. No.: 388,494

[22] Filed: Jun. 14, 1982

Related U.S. Application Data

[63] Continuation-in-part of Ser. No. 137,507, Apr. 4, 1980, Pat. No. 4,340,634, which is a continuation-in-part of Ser. No. 276,791, Jun. 24, 1981.

[30] Foreign Application Priority Data

Apr. 10, 1979 [DE]  Fed. Rep. of Germany ....... 2914476
Jul. 17, 1979 [DE]  Fed. Rep. of Germany ....... 2928848

[51] Int. Cl.³ .......................... B32B 3/10; B32B 3/28

[52] U.S. Cl. .................................. 428/207; 427/256; 427/271; 427/282; 427/404; 427/407.1; 427/411; 428/201; 428/209; 428/211; 428/323; 428/332

[58] Field of Search .................. 428/142, 134–136, 428/256, 332, 209, 537, 904.4, 201, 207, 211, 323; 427/258, 271, 282, 404, 407.1

[56] References Cited

U.S. PATENT DOCUMENTS 2,931,751  4/1960  Du Fresne ..................... 428/256

Primary Examiner—Paul J. Thibodeau
Attorney, Agent, or Firm—Michael N. Meller

[57] ABSTRACT

The wall/ceiling covering has a reflectivity for infrared radiation of more than 60% and comprises a substrate of paper or plastic or tile material, a discontinuous thin metal layer, a veneer protective layer thereon and a veneer coating which comprises a binder and at least one coloring agent, and which is substantially transparent in the wavelength range of 4 to 20 μm.

18 Claims, 3 Drawing Figures

HEAT REFLECTING WALL OR CEILING COVERING

RELATION TO OTHER APPLICATIONS

This application is a continuation-in-part of Application Ser. No. 137,507 filed Apr. 4, 1980, now U.S. Pat. No. 4,340,634 and Ser. No. 276,791 filed June 24, 1981, which in turn is a continuation-in-part of said Application Ser. No. 137,507.

BACKGROUND OF THE INVENTION

1. Field of the Invention

This invention relates to heat-reflecting wall/ceiling coverings and the method for producing the same comprising a substrate, made of paper, plastic, a typical tile material or the like, an optional adhesive coat, a thin metal or metallized coat, a varnish-protecting layer thereon, and finally a varnish coat of printing ink, pigment or the like layers with these applied on one or both sides of said substrate.

2. Description of the Prior Art

German Utility Model No. 7,343,047 already discloses a known wall liner material conprising of a hard foamed layer with an aluminum layer attached thereto. The outer surface of the aluminum layer may be embellished by an embossed pattern and provided with a protective veneer coating to obtain dirt-repellent properties.

German Pat. No. 677,123 teaches a metallized wallpaper, in which the metallic surface layer as well as the underlying intermediate paper layer are provided with aligned perforations in order to achieve improved moisture permeability, the two interconnected and perforated layers being attached to a further non-perforated paper-base layer.

German Pat. No. 800,857 also shows a metallized wallpaper of the above defined type, this wallpaper being provided with a very thin veneer layer which may or may not be colored in any manner.

These prior art wallpaper or liners have in common the disadvantage that they are not able to effect optimum heat reflection, when having colored coatings. Metal layers contained in these prior art disclosures must be provided with a colored coating, otherwise the glossy metallic surfaces are not acceptable to homeowners and decorators in both the consumer and industrial markets.

OBJECTS AND SUMMARY OF THE INVENTION

It is therefore a primary purpose of the present invention to provide a heat reflecting wall or ceiling covering which has a particularly pleasant appearance, due to its design in the form of an infrared-permeable varnish coat of printing ink, pigment and the like which possesses high heat insulation and/or reflection characteristics. Such a wall/ceiling covering has also both comfort-enhancing and cost-saving effects enabling savings in heat energy of the order of 20%.

Another important advantage of such wall/ceiling covering is that the metal or metallized layer therein, preferably of vapor deposited aluminum layers or thin foils of aluminum, is discontinuous so that the wall or ceiling cover has substantially no transverse electrical conductivity, eliminating any potential risk in the use of such covers for example, when accidentally contacted by current carrying wiring, electrical switches and the like frequently encountered in walls and ceilings.

It is a further purpose of the present invention to provide a method for the production of a heat-reflecting wall/ceiling covering of the above-mentioned type which makes it possible, even when using elastic or plastic substrates, for the metal coat to lose substantially all of its electrical conductivity.

It is generally known that, due to the high density of free electrons, metal layers are able to reflect electromagnetic radiations at layer thicknesses considerably thinner than the wavelength of the radiation. The magnitude of reflection is correlated to the surface resistance of the metal layer and does no longer increase appreciably above a surface resistance of 2 Ohm per square for 1 $\mu$m $<\lambda<$ 20 $\mu$m. For a more detailed description of this means of measuring, see Taschenbuch Elektrotechnik (in German) Edited by Prof. Dr. Eugen Philippow and Published by Carl Hauser Verlag, Munich, Vol. 3, pp. 380–381. This corresponds to a thickness of 14 nanometers for an aluminum layer, i.e. the metal most frequently used for vapor deposition. In order to also include other metals and to make allowance for irregularities in the vapor-deposited layer, the thickness thereof has been established at 30 nanometers. Layers of greater thickness are also possible, but greater thickness does not necessarily result in further improved reflectivity. Rather greater thickness of the layer requires a larger amount of material to be vapor-deposited, resulting in unnecessary production costs. In the case of greater thicknesses of this layer, also, there might be a problem with effectively breaking it up into numerous small islands upon calendaring or the like. It is only if this break-up of the metal layer is achieved to a sufficient extent that the substantially non-conductive property of the metallic layer is achieved.

This is accomplished according to one embodiment of the invention by having an adhesive coat between the substrate and the metal coat which hardens to become breakable or brittle. Such a hardened coat can then be broken up or deformed mechanically in order to form cracks in the overlying coat of metal. The essential concept in this method is that the metal coat bear on a hard or brittle coat, relative to the elastic or plastic substrate and capable of breaking when deformed mechanically. In order to produce such an adhesive coat, there can be employed materials which either harden of themselves or can be hardened by external action, for example, by means of light, particularly UV—or IR radiation or by means of electron beams. This type of adhesive coat need not be hardened over its entire surface; it suffices, for instance, if this coat is only hardenable in a pre-determined pattern, in order to ensure that it breaks only in certain areas by mechanical deformation. This embodiment which is considered to be the best mode employs as suitable materials for such adhesive brittle coats, self-hardening or hardenable varnishes, such as polyesters, polyurethanes, epoxides, phenols or acrylates, as will be readily obvious to the skilled worker in the art. The mechanical deformation of an entire coat structure, comprising the substrate, adhesive coat, metal coat, another adhesive varnish protecting coat and the varnish coat, can be accomplished, for instance, by embossing.

The thickness of the veneer protection layer which also serves as the primer for the covering veneer layer is selected so that it becomes substantially free of pores by repetitive application in order to prevent corrosion of the metal layer. At the same time, it remains highly transparent over the entire spectral range of thermal radiation. Depending on the type of veneer and the method of application, this thickness lies around 1 μm, preferably 0.5 μm.

Instead of employing a flexible substrate primarily for application to walls, a rigid substrate such as a tile material made of ceramics, asbestos, polystyrene-type foam or the like, can also be employed. Such tiles, for instance, need not have the metal layer torn or made discontinuous, as this electrical resistance can be affected by the appropriate placing of the tiles on walls and ceilings. Tiles of this type can be employed for the lining of walls and ceilings in all kinds of enclosed spaces, including if made of properly selected materials, such "wet" or "humid" places as swimming pools, bathrooms, laundry rooms and the like resulting in a 20% or more savings from an energy standpoint by eliminating the need for keeping the air in an indoor swimming pool for instance 3-4 degrees centigrade higher than the water, while keeping the humidity at comfortably low levels.

The main reason for employing the covering material of this invention is the decoration of walls and/or ceilings. The appearance of the wall/ceiling covering of this invention must not be affected to any appreciable degree by other functions, even if these, as in the present case, result in considerable improvements and/or energy savings. It is therefore essential that the underlying metallic-looking wall covering be provided with selected colors. Conventional wall paints for instance are based, however, on binders having very pronounced infrared absorption properties. These paints are applied in uncontrollable thicknesses and contain pigments, the selection and particle size of which, is solely governed by visual criteria. In the wavelength range of thermal radiation, such paints therefore have an absorbent effect, i.e., they give a "black" or "cold" impression.

In order to retain the high thermal reflectivity and hence the cozy and energy-saving effects of a metallized wall/ceiling covering, the color applied with the veneer layer comprising a pigment, printing ink or the like, has to be substantially transparent in the wavelength range of 4 to 20 μm. This is obtained by employing binders having no appreciable absorption properties within this range and containing dissolved coloring agents which are likewise transparent in this spectral range and/or pigments, the coloring of which is independent of their particle size. Known binders which are transparent in the infrared range are for instance polymethylene or diazo methane, low density polyethylene, high density polyethylene, isomerized rubber (cyclo-rubber), various polyamides, low-molecular acrylates, etc. The total infrared absorption of layers of these materials having a thickness of 10 μm is less than 10%.

the thickness of the veneer protection layer should be selected to be as small as possible, preferably not greater than λ/4 as referred to the shortest relevant wavelength. A coating thickness of for instance 0.5 μm has been found to be particularly suitable. This layer may consist of the same binder materials as employed for the veneer coating, such as polymethyl acrylate.

For coloring the binder layer that forms the veneer coating, it is preferable to employ coloring agents which are transparent in the infrared range, such as alizarine or azo dyes. When pigment particles are employed in the binder coating and in order to adapt this layer for use as a priming coat, such pigment particles should all have a diameter of less than 1 μm. Thus, for instance, the size distribution of the pigment particles which has been found suitable, is one in which the particle diameters are in a Gauss distribution of about 0.35 μm. The ratio of binder to pigment particles should be selected as wide as possible and the coating thickness of the veneer as narrow as possible. Preferably the coating thickness and the binder/pigment ratio are selected such that an average of about two pigment particle strata are loosely imbedded in the binder, resulting in a high transparency of the veneer layer over the entire relevant infrared range. An acceptable thickness of this layer lies for instance within the order of between 1.5 to 2.0 μm. Suitable pigments are substances lacking infrared molecular resonance. Such resonances are characteristic for instance in organic substances including radicals. Preferably suitable are inorganic pigment compositions such as $TiO_2$.

The combined effect of colored pigments with a coloring by means of soluble dyes in the binder coating in accordance with the above-described principle may result in various color effects within the optical range, offering a wide freedom of choice for color designs.

The invention also recognizes that a heat reflecting wall/ceiling covering material will only be economically useful it it is in fact accepted by the consumer. This can only be achieved if the covering material can be processed in accordance with conventional techniques, i.e. without additional expenditure and without expensive methods, for instance without the requirement of special adhesives. Thus, if the covering material can be printed with the customary patterns, it can then conform to the requirements of the market.

These requirements can be satisfied by a heat-reflecting wallpaper, comprising a carrier material consisting of a thin special paper covered with a thin primer veneer coating; a metal layer; a veneer protection layer; and a veneer coating thereon. The carrier material can then be attached to a wallpaper base by means of an adhesive lining.

Wallpapers of this type may readily be processed in accordance with conventional wallpapering methods. Moreover, the outer face of the wallpaper may be printed with customary designs or patterns by conventional printing methods. Both of these properties make the wallpaper acceptable to the consumer, so that it is willingly employed, whereby the desired economic benefit of a saving of heat energy is also accomplished. Since the wallpaper can be printed with the customary designs or patterns, it provides the same aesthetic qualities as hitherto known wallpapers, with the additional advantage that a considerable amount of energy is saved for room heating.

Turning now to one embodiment of the hardened adhesive coat, this brittle material will break down into distinct pieces during a mechanical deformation at many points with the metal coat thereon likewise broken. The metal coat is thus split into a plurality of practically separate and irregular partial surfaces, so that the ohmic resistance of the wallpaper is so increased and the electrical conductivity respectively of the coat is so reduced, that any danger, because of potential contact with electrical wiring is substantially minimized, if not outright eliminated.

A particularly suitable method for stabilizing the cracks in the metal coat, particularly employing substrates of thermoplastic material is carried out as follows: The coat structure consists of the layers of (1) the substrate; (2) the adhesive coat layer hardening at least into a pattern applied thereupon; (3) the metal coat; (4) the varnish-protecting coat applied thereon if necessary; and (5) the varnish coat. This coat structure is then conducted over a heated embossing roll for the mechanical deformation of the hardened adhesive coat. The embossing roll is kept at a temperature which is so high that the thermoplastic material of the substrate is permanently deformed, but still low enough so that this adhesive coat remains in a hard and breakable i.e. nonplastic state at this temperature. The coat structure arrangement is then preferably so conducted over the embossing roll that the substrate is in contact with the embossing roll. Because of the heated roll, the substrate is heated to such an extent that, when the coat arrangement is conducted over it, the thermoplastic material begins to flow in the substrate during the embossing. The subsequent cooling of the thermoplastic material maintains its changed shape resulting in a permanent deformation that determines the shape and form of the cracks in the metal coat. With this method, it is possible to treat substrates consisting entirely of thermoplastic materials, e.g. pure plastic sheets and substrates of another base material, such as textiles or non-woven fabrics or paper, that are provided with a plastic coat or impregnated with a plastic.

According to another embodiment of this invention, the problem of conductivity in the metal layer can be eliminated by designing the varnish-protecting coat on the metal coat as a masking to form a predetermined pattern. This is particularly advantageous with the tile materials where the substrate could not tolerate any calendaring or breaking of the metal layer into islands to largely eliminate electrical conductivity. Here then, the metal coat is subdivided by an etching process into a plurality of insular partial surfaces corresponding to this pattern. Following this step, the varnish coat is applied. Employing this method, it may be advisable to provide an adhesive coat between the substrate and the metal coat, however, such an adhesive coat is not absolutely necessary, depending on the type of the substrate selected and the vaporized partial coat. As a varnish protecting coat, one could also employ a photoresist which is exposed with a desired picture according to the pattern. Depending on the selection of the photoresist, the exposed and unexposed areas are hardened and can be dissolved in a subsequent washing process. The metal coat exposed in this manner according to the pattern, can then be etched by known etching processes, so that only the partial coat under the photoresist areas which have not been washed out remain. The varnish coat can then be applied directly onto the coat arrangement consisting of the substrate, insular metal coat surfaces and photoresist surfaces.

Another particularly simple method according to the invention for the solution of the above problem consists in treating the thin metal coat or the surface of the adhesive varnish-protecting coat already applied on the metal coat mechanically in such a way, that before other coats are applied, the metal coat is severed along a plurality of lines. Since the metal coat itself is extremely thin, preferably less than 30 nanometers and the adhesive varnish-protecting coat applied thereon, is likewise extremely thin as it has only a thickness of a few micrometers, mechanical abrasion, such as treatment with brushes or combs, suffices to form the desired lines separating the metal coating to make the same non-conductive. To this end, the substrate is preferably passed over revolving brushes or combs. This way a grid pattern is scratched into the surface in a simple manner, so that a plurality of unconnected partial surfaces is formed in the metal layer. There is applied on this metal coat the adhesive varnish-protective coat to prevent corrosion of the metal coat and finally the IR-permeable varnish coat.

Another embodiment according to this invention involves placing a mask on the substrate, vapor-depositing the metal on the mask in a structure corresponding to the mask and after removing the mask, applying the adhesive varnish protecting coat and the varnish coat. This is preferably done in a manner so that the substrate is brought into contact with a mask having the recesses which must correspond to the pattern which the applied metal coat is to have in the finished state. The metal coat is preferably applied by vapor-deposit through the mask, although deposit from a plating bath is also within the scope of this invention. After vaporization, the mask is removed from the substrte and then the adhesive varnish-protecting coat, as well as the final varnish coat is applied. The mask could consist, for instance, of an endless wire net belt which is brought into contact with the substrate in front of a vapor-deposit zone for the application of the metal coat while resting on the substrate. The vapor is then deposited through the wire net. After leaving the vapor deposit zone, the wire net can then be detached from the substrate and returned to the inlet side of the vaporization zone.

Vapor depositing the metal coat, as contrasted to application of the metal coat from a solution, has the advantage that the metal coat has a higher degree of reflectivity and that the metal coat can be produced more economically.

In order to facilitate processing of the wallpaper in accordance with conventional techniques, the wallpaper base is selected in the weight range of 100 to 200 g/m$^2$, the metal-coated thin special paper is selected in the weight range of 10 to 50 g/m$^2$, and the adhesive lining is applied therebetween in a thickness of about 10 μm. This combination of layers has already been successfully put to practical tests. During development of the wallpaper, according to the invention, it was found that the adhesive lining, which originally had been intended solely for bonding the wallpaper base to the carrier material, is preferably selected such that it additionally performs the following functions:

1. The adhesive lining, which consists for instance of polyvinyl chloride and is used in the finished wallpaper to bond the wallpaper base to the special paper, so that it extends in the mechanically neutral zone, is preferably of a sort of flexible material so as to improve the pliancy and flexibility of the finished wallpaper. This enables the hobby craftsman to attach the paper to a wall or ceiling without difficulty.

2. By selecting a suitable chemical composition for the adhesive lining, the combustibility and inflammability of the wallpaper can also be reduced.

3. The chemical composition of the adhesive lining is preferably selected such that it protects the metal layer from corrosion by alkaline substances exuded by an underlying wall/ceiling.

Depending on their surface temperature and emission characteristics, outside walls absorb the body heat of the inhabitants. If this heat is reflected by the wallpaper, it induces a radiation climate within the room, so that the required comfort is ensured even at lower room temperatures.

This effect is of considerable economic importance, as it permits the air and room temperature of heated spaces to be lowered by at least 2° to 5° C., without undesirable physiological effects.

A particularly pleasant room climate is also ensured by the fact that since the metal layer is extremely thin and that it is torn during calendaring or rolling of the wallpaper so as to make it electrically non-conductive, it also thereby becomes permeable to water vapor, enabling so-to-speak the breathing of a room.

BRIEF DESCRIPTION OF THE DRAWINGS

The invention will now be described more fully on the basis of the embodiments represented in the drawings by way of example.

Figure 1:
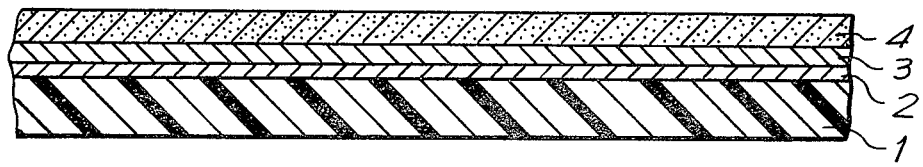
FIG. 1 shows a cross-sectional view of wall/ceiling covering material showing the principal operating layers of this wall/ceiling cover invention.

The wall/ceiling covering in FIG. 1 comprises a carrier material 1, preferably a paper or plastic based material, to which a very thin metal layer 2 is applied, preferably by vapor deposition. Before processing further, these combined layers are subjected to mechanical treatment, preferably by an embossing or punching operation causing the metal layer 2 to be torn to numerous small areas or islands. A thin veneer protection layer 3 is then applied onto metal layer 2. There is then applied the veneer coating 4 of for instance printing ink or a binder containing dyestuffs/pigments dissolved or dispersed therein respectively.

The basic purpose of a wall or ceiling lining material of this type is to conserve the thermal energy within a room by reflecting heat from the walls or ceilings, so that it is not lost by absorption into or passing through the walls or ceilings.

As is evident from the foregoing description, the invention provides a color-decorated, i.e. printed or pigmented wall/ceiling covering material having a reflectivity for infrared radiation of more than 60%. Hitherto known cover materials that were printed or otherwise colored have had a reflectivity for infrared radiation or no more that 5-10%.

Figure 2:
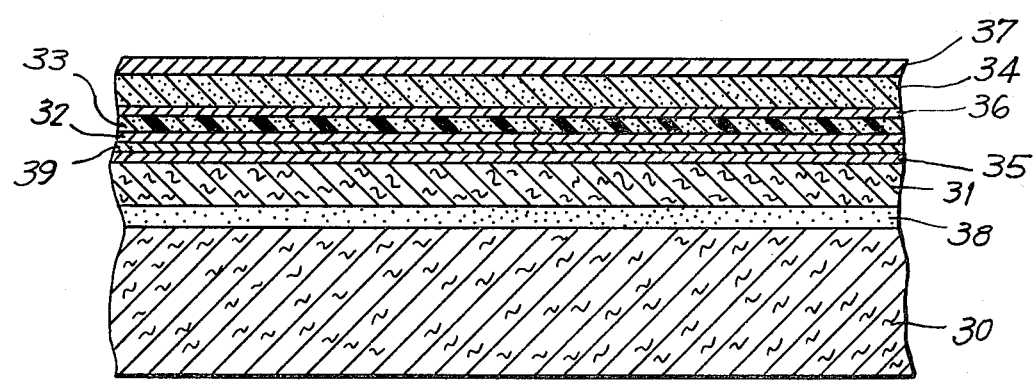
FIG. 2 shows a cross-sectional view of wall/ceiling covering material according to the best mode and preferred embodiment of the invention set forth in this application.

In the embodiment of the invention shown in FIG. 2, a wallpaper comprises a wallpaper base 30 of wood paper having a weight range of 80-300 gms/m$^2$ provided with an adhesive lining 38 of a lamination glue 5-30 μm in thickness onto which a thin layer of a special moisture and alkali resistant paper 31 having a weight range of 40-100 gms/m$^2$ is applied. This special paper layer 31 then has a clay coating 35 of 2-30 μm thickness thereon and a base coat or priming layer 39 having a thickness of 1-20 μm with a thin metal layer 32 of aluminum for instance vapordeposited thereon in a thickness of 10 to 1000 nanometers. The metal layer 32 carries a thin veneer protection layer 33 or print primer having a thickness of 0.2-10 μm covered by a white base cover layer 36 in a thickness of 1-20 μm providing the neutral white background for a finishing veneer coating 34 of printing ink, pigment or the like in a thickness of 0.2-2 μm. As already stated above, this veneer coating may be in the form of a mono- or polychrome color print. Finally, this sandwich is topped off by a molecular layer of a dust and water repellent material 37 such as wax or a fluorine compound in a thickness of 0.05-1.0 μm.

A preferred wallpaper structure shall now be described by way of example, with a plurality of layers designated a to h from the rear surface to the front surface of the wallpaper:

(a) a wallpaper base of wood paper having a weight of about 150 g/m$^2$;

(b) a lamination glue consisting of an adhesive lining of polyvinyl chloride having a thickness of 15 μm;

(c) a special moisture-resistant paper having a weight of about 75 g/m$^2$ provided with a clay coating of about 10 μm thickness;

(d) a veneer layer of PVC copolymer having a thickness of about 3 μm;

(e) an aluminum layer having a thickness of about 30 nm;

(f) a veneer protection layer of PVC copolymer having a thickness of about 0.5 μm;

(g) a veneer coating comprising a binder layer of polymethacrylate having a thickness of 2-3 μm. Dispersed in the binder layer are $TiO_2$ pigment particles having diameters of less than 1 μm. The binder/pigment weight ratio is 50%. This veneer layer is also printed with an alizarine dye diffusing therein, in a thickness of 2 μm; and (h) a molecular layer of dust and water repellent material of about 0.1 μm thickness.

Figure 3:
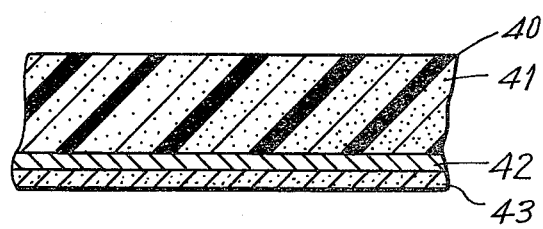
FIG. 3 shows a cross-sectional view of a tile material having on its exposed side an aluminum layer, an optional varnish protecting layer with a varnish layer or the like as the outermost layer.

FIG. 3 shows a further embodiment of a tile material 40 preferably made of polystyrene foam 41, but also equally useful materials would be pressed and/or shaped cardboard, ceramic materials especially useful in "wet" or humid surroundings and the like.

Such a tile material can then be covered by a thin layer of aluminum foil or a layer of aluminum 42 can be deposited thereon in a thickness of 5 μm to 1 mm. A varnish layer of printing ink, pigment or the like 43 can then be deposited on the aluminum directly in a thickness of 0.2-10 μm or optionally after an inbetween varnish protective coat of for instance polymethyl acrylate has been inserted.

It is evident that those skilled in the art, once given the benefit of the foregoing disclosure, may now make modifications of the specific embodiments described herein without departing from the spirit and scope of the present invention. Such modifications are to be considered within the framework of this invention which is limited wholly by the scope and spirit of the appended claims.

We claim:

1. A heat-reflecting covering material for walls and ceilings, having a reflectivity for infrared radiation of more than 60%, comprising a laminate of (a) a base substrate material made of wood paper having a weight range of 80 to 300 gms/m$^2$;

(b) an adhesive lining of a lamination glue 5 to 30 μm in thickness on said base substrate material;

(c) a thin layer of a moisture and alkali resistant paper having a weight range of 40 to 100 gms/m$^2$ thereon;

(d) a clay coating of 2 to 30 μm thickness;

(e) a base coat of priming layer in a thickness of 1 to 20 μm;

(f) a discontinuous aluminum layer 10 to 1000 nanometers in thickness;
(g) a thin veneer protection layer in a thickness of 0.2 to 10 µm;
(h) a white base cover layer in a thickness of 1 to 20 µm providing the neutral white background;
(i) a finishing veneer coating in a thickness of 0.2 to 2 µm and comprising a binder and at least one coloring agent, said veneer being substantially transparent in the wavelength range of 4 to 20 µm; and
(j) a molecular layer of dust and water repellent material in the thickness of 0.05 to 1.0 µm.

2. The covering material as in claim 1, wherein the wood paper has a weight of about 150 gms/m².

3. The covering material as in claim 1, wherein the lamination glue consists of an adhesive lining of polyvinyl chloride in a thickness of 15 µm.

4. The covering material as in claim 1, in which the moisture and alkali resistant paper has a weight of about 75 gms/m².

5. The covering material as in claim 1, wherein the clay coating has a thickness of about 10 µm.

6. The covering material as in claim 1, wherein the base coat comprisis a PVC copolymer having a thickness of about 3 µm.

7. The covering material as in claim 1, wherein the discontinuous aluminum layer has a thickness of about 30 nanometers.

8. The covering material as in claim 1, wherein the veneer protection layer comprises a PVC copolymer having a thickness of about 0.5 µm.

9. The covering material as in claim 1, wherein the white base cover layer is 2 to 3 µm in thickness to provide a white neutral background.

10. The covering material as in claim 1, wherein the veneer coating comprises a binder layer of polymethyl acrylate having a thickness of 2 µm with $TiO_2$ pigment particles having diameters of less than 1 µm in a binder/pigment weight ratio of 50%.

11. The covering material as in claim 8, wherein the veneer layer is also printed with an alizarine dye diffusing therein in a thickness of 2 µm.

12. The covering material as in claim 1, wherein the molecular layer of dust and water repellent material is about 0.1 µm in thickness.

13. A tile covered by the material of claim 1.

14. A tile provided with a covering material having a reflectivity for infrared radiation of more than 60%, said covering material comprising a thin discontinuous layer of aluminum in a thickness of 5 µm to 1 millimeter and a veneer layer comprising a binder and at least one coloring agent on said aluminum layer in a thickness of 0.2 to 10 µm, said veneer layer being substantially transparent in the wavelength range of 4 to 20 µm.

15. The tile covering material as in claim 14, having an intermediate varnish protective layer of polymethyl acrylate.

16. A process of producing a covering material, comprising the sequential steps of
 (a) providing a base substrate material made of wood paper having a weight range of 80 to 300 gms/m²;
 (b) applying an adhesive lining of a lamination glue 5 to 30 µm in thickness on said base material;
 (c) adhering a thin layer of moisture and alkali-resistant paper having a weight range of 40 to 100 gms/m² to said adhesive lining;
 (d) applying a clay coating of 2 to 30 µm thickness on top of said moisture and alkali resistant paper;
 (e) applying a base coat of priming layer in a thickness of 1 to 20 µm on said clay coating;
 (f) depositing a discontinuous aluminum layer 10 to 1000 nanometers in thickness on said priming layer;
 (g) applying a thin veneer protection layer in a thickness of 0.2 to 10 µm on said aluminum layer;
 (h) applying a white base cover layer in a thickness of 1 to 20 microns providing the neutral white background on said veneer protection layer;
 (i) applying to said white base a finishing veneer coating substantially transparent in the wavelength range of 4 to 20 µm and comprising a binder and at least one coloring agent;
 (j) applying a molecular layer of dust and water repellent material in a thickness of 0.05 to 1.0 µm to said finishing veneer coating.

17. A process of producing a tile with a covering material thereon, said covering material having a reflectivity for infrared radiation of more than 60% by coating a tile with a thin, discontinuous layer of aluminum in a thickness of 5 µm to 1 millimeter and then with a veneer layer comprising a binder and at least one coloring agent in a thickness of 0.02 to 10 µm, said veneer layer being substantially transparent in the wavelength range of 4 to 20 µm.

18. The process as in claim 16, further comprising the step of applying an intermediate varnish protective layer of polymethyl acrylate between steps (i) and (j).

* * * * *

UNITED STATES PATENT AND TRADEMARK OFFICE
CERTIFICATE OF CORRECTION

PATENT NO. : 4,433,025   Page 1 of 2
DATED : Feb. 21, 1984
INVENTOR(S) : Pusch et al It is certified that error appears in the above-identified patent and that said Letters Patent are hereby corrected as shown below:

In the heading:

[63] Change to read:--Continuation-in-part of Ser. No. 137,507 Apr. 4, 1980, Pat. No. 4,340,634 and Ser. No. 276,791, Jun. 24, 1981 which is a continuation-in-part of Ser. No. 137,507--

Column 1, line 25, change "conprising" to --comprising; delete "of".
Column 1, line 42, change "wallpaper" to --wallpapers--
Column 1, line 68, change "accidentially" to --accidentally--
Column 2, line 15, change "Ohm" to --ohm--
Column 2, line 18, change "Edited" to --edited--
Column 2, line 19, change "Published" to --published--
Column 2, line 49, delete "-" after "UV"
Column 3, line 17, insert a comma after "like"
Column 3, line 35, delete the comma after "which"
Column 3, line 57, change "the" to --The-- (first word of line)
Column 4, line 27, change "it" to --if-- (1st occurrence)
Column 4, line 68, insert a comma after "material"
Column 5, line 20, insert a comma after "shape"
Column 5, line 63, insert a comma after "nanometers"
Column 5, line 64, delete the comma after "thereon"

UNITED STATES PATENT AND TRADEMARK OFFICE
CERTIFICATE OF CORRECTION

PATENT NO. : 4,433,025                     Page 2 of 2
DATED : Feb. 21, 1984
INVENTOR(S) : Pusch et al It is certified that error appears in the above-identified patent and that said Letters Patent are hereby corrected as shown below:

Column 6, line 21, change "substrte" to --substrate--
Column 6, line 22, insert a comma after "coat"
Column 7, line 5, change "C.," to --C,--
Column 7, line 63, change "vapordeposited" to --vapor-deposited--
Column 9, line 24, change "comprisis" to --comprises--

Signed and Sealed this

Tenth Day of July 1984

[SEAL]

Attest:

GERALD J. MOSSINGHOFF

Attesting Officer      Commissioner of Patents and Trademarks